US008818291B2

(12) United States Patent
Li et al.

(10) Patent No.: US 8,818,291 B2
(45) Date of Patent: Aug. 26, 2014

(54) METHOD AND DEVICE FOR ANTENNA CALIBRATION

(75) Inventors: Chuanjun Li, Beijing (CN); Changguo Sun, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 218 days.

(21) Appl. No.: 13/577,122

(22) PCT Filed: Jan. 31, 2011

(86) PCT No.: PCT/CN2011/000189

§ 371 (c)(1), (2), (4) Date: Aug. 3, 2012

(87) PCT Pub. No.: WO2011/095063

PCT Pub. Date: Aug. 11, 2011

(65) Prior Publication Data

US 2012/0299769 A1 Nov. 29, 2012

(30) Foreign Application Priority Data

Feb. 5, 2010 (CN) .......................... 2010 1 9114057

(51) Int. Cl.
*H04B 17/00* (2006.01)

(52) U.S. Cl.
USPC ..................... 455/67.11; 455/67.13; 455/101; 455/562.1; 455/115.1; 455/575.7; 342/174; 342/360; 342/368; 375/267; 375/347; 375/299; 370/334

(58) Field of Classification Search
USPC ............. 455/67.11, 67.13, 101, 115.1, 562.1, 455/575.7
See application file for complete search history.

(56) References Cited

U.S. PATENT DOCUMENTS 5,260,968 A * 11/1993 Gardner et al. ............... 375/347
6,615,024 B1 * 9/2003 Boros et al. ................ 455/67.14

(Continued)

FOREIGN PATENT DOCUMENTS

CN 101060389 10/2007
CN 101064902 10/2007

(Continued)

OTHER PUBLICATIONS

International Search Report for PCT/CN2011/000189 dated Apr. 28, 2011.

(Continued)

*Primary Examiner* — Marceau Milord
(74) *Attorney, Agent, or Firm* — Foley & Lardner LLP; James F. Ewing; Paul M. H. Pua

(57) ABSTRACT

A method for antenna calibration is provided, which includes the following steps: obtaining an updated calibration period T_i after the last time of antenna calibration (S301), calculating a calibration sequence of each antenna channel in the calibration period T_i (S302); according to the calibration sequence of each antenna channel, calibrating each antenna based on the calibration period T_i, and calculating a calibration error parameter (S303); and according to the obtained calibration error parameter, updating the calibration period T_i, and using the updated calibration period T_i for the next time of antenna calibration (S304). The technical solutions provided in the present invention, can monitor difference variety of radio channels in real time by the calibration error parameter, and reflect the calibration precision in real time by the reported calibration error parameter. Moreover, the technical solutions provided in the present invention, can adjust the calibration period in real time according to the calibration error parameter, and timely execute rational antenna calibration according to the calibration precision status.

12 Claims, 3 Drawing Sheets

(56) References Cited

U.S. PATENT DOCUMENTS

| | | | | |
|---|---|---|---|---|
| 6,668,161 | B2 * | 12/2003 | Boros et al. | 455/67.14 |
| 6,738,020 | B1 * | 5/2004 | Lindskog et al. | 342/377 |
| 6,961,325 | B1 * | 11/2005 | Avidor et al. | 370/336 |
| 7,205,936 | B2 * | 4/2007 | Park et al. | 342/368 |
| 7,209,515 | B2 * | 4/2007 | Kilfoyle et al. | 375/152 |
| 7,551,699 | B2 * | 6/2009 | Reichgott et al. | 375/347 |
| 7,928,906 | B2 * | 4/2011 | Leather et al. | 342/360 |
| 8,280,430 | B2 * | 10/2012 | Naguib et al. | 455/550.1 |
| 8,379,592 | B2 * | 2/2013 | Van Rensburg et al. | 370/330 |
| 8,441,966 | B2 * | 5/2013 | Kenington et al. | 370/282 |
| 8,498,669 | B2 * | 7/2013 | Naguib et al. | 455/562.1 |
| 2005/0140546 | A1 | 6/2005 | Park et al. | |
| 2009/0167311 | A1 | 7/2009 | Tong et al. | |
| 2009/0186590 | A1 | 7/2009 | Gale | |

FOREIGN PATENT DOCUMENTS

| | | |
|---|---|---|
| CN | 101119147 | 2/2008 |
| EP | 0642191 | 3/1995 |
| EP | 1296465 | 3/2003 |

OTHER PUBLICATIONS

Office Action for European Patent Application No. 11 739 342.1 dated Jun. 19, 2013 (7 pages).

Supplementary European Search Report for European Patent Application No. 11 739 342.1 dated Jun. 5, 2013 (3 pages).

* cited by examiner

METHOD AND DEVICE FOR ANTENNA CALIBRATION

CROSS-REFERENCE TO RELATED APPLICATIONS

The present application is a US National Stage of International Application No. PCT/CN2011/000189, filed 31 Jan. 2011, designating the United States, and claiming priority to Chinese Patent Application No. 201019114057.3 filed 5 Feb. 2010. The entire contents of the foregoing applications are hereby incorporated herein by reference.

FIELD OF THE INVENTION

The present invention relates to the field of mobile communications and particularly to an antenna calibrating method and device.

BACKGROUND OF THE INVENTION

Mobility and broadband has become a development trend of modern communication technologies, and how to alleviate influences of co-channel interference, multi-access interference and multi-path fading has become a predominant factor considered while improving the performance of a wireless mobile communication system. In recent years, an intelligent antenna technology has become a study hotspot in the field of mobile communications.

The smart antenna technology brings a significant advantage to a mobile communication system. For example, smart antennas are used in connection with other baseband digital signal processing technologies, e.g., joint detection, interference cancellation, etc., and with the use of the smart antenna technology in a wireless base station, the base station receives a signal which is the sum of signals received by respective antenna elements and receivers, and if a maximum power integration algorithm is adopted, the total received signal will be improved by 10*1gN dB without considering multi-path propagation, where N is the number of antenna elements. With the presence of multiple paths, this improvement of reception sensitivity will vary with a multi-path propagation condition and an uplink beam forming algorithm and may also approach a gain of 10*1gN dB.

At present, the smart antenna technology has become one of primary trends in the development of communication technologies at the physical layer. The smart antenna technology can be applied not only in a Time Division Duplex (TDD) system but also in a Frequency Division Duplex (FDD) system, and wide applications of smart antennas have offered us a leading and perfect technology platform over which the development of mobile communication technologies has been impelled to some extent.

Smart antennas are applied particularly in a mobile communication system, for example, in a TD-SCDMA (Time Division-Synchronization Code Division Multiple Access) system with an 8-element smart antenna array with 8 element antenna ports and 1 calibration port and the antennas are installed by connecting nine cables including a calibration cable. The presence of the plurality of antennas necessitates calibration of the antennas in a practical network. In an existing antenna calibrating technology, a calibration period is set manually, and it is impossible to report in real time the presence of the differences of amplitudes and phases of respective radio frequency channels after the calibration. If the differences of the amplitudes and the phases of the radio frequency channels last for a long calibration period, there may be a strong influence on downlink beamforming, particularly beamforming of a broadcast channel, thus resulting in broadcast beam distortion and failing to satisfy required beamforming of 65+/−5 degrees for network planning.

An existing antenna calibrating method typically includes the following steps:

a calibration period is set; a reception calibration sequence is transmitted at a baseband and a reception calibration coefficient $C_{RX}$ is calculated; a transmission calibration sequence is transmitted at a baseband and a transmission calibration coefficient $C_{TX}$ is calculated; and it is determined, according to a calibration period, whether to perform next reception calibration and transmission calibration, the $C_{RX}$ and $C_{TX}$ are used in this calibration period.

The existing antenna calibrating technology generally has the following two disadvantages.

(1) Calibration precision cannot be fed back, and therefore such a condition cannot be monitored that there is still a difference of a radio frequency channel after the calibration.

(2) The calibration period cannot be adjusted in real time according to the calibration precision by shortening the calibration period for a rapidly varying radio frequency channel or lengthening the calibration period for a slowly varying radio frequency channel.

Therefore, it is necessary to propose such a technical solution that the difference of the radio frequency channel can be monitored in real time through calibration error parameters and the calibration precision can be inspected in real time by reporting the calibration error parameters and a calibration period can be adjusted in real time according to the calibration error parameters by shortening the calibration period for a rapidly varying radio frequency channel or lengthening the calibration period for a slowly varying radio frequency channel.

SUMMARY OF THE INVENTION

An object of the invention is intended to address at least one of the foregoing disadvantages in the prior art particularly by monitoring in real time calibration error parameters, obtaining in a timely way a varying difference of the radio frequency channel, adjusting in real time a calibration period according to the calibration error parameters and performing in a timely way reasonable antenna calibration in view of the calibration precision.

In order to achieve the foregoing object, an aspect of embodiments of the invention provides an antenna calibrating method including the steps of:

obtaining a calibration period T_i updated after previous antenna calibration and calculating a calibration sequence of each antenna channel in the calibration period T_i; calibrating each antenna in the calibration period T_i according to the calibration sequence of the each antenna channel and calculating calibration error parameters; and updating the calibration period T_i according to the obtained calibration error parameters, wherein the updated calibration period T_i is used for next antenna calibration.

Another aspect of the embodiments of the invention provides an antenna calibrating device including:

an obtaining module configured to obtain a calibration period T_i updated after previous antenna calibration;

a calculating module configured to calculate a calibration sequence of each antenna channel in the calibration period T_i;

a calibrating module configured to calibrate each antenna in the calibration period T_i according to the calibration sequence of the each antenna channel and to calculate calibration error parameters; and an updating module configured to update the calibration period T_i according to the obtained calibration error parameters, wherein the updated calibration period T_i is used for next antenna calibration.

The foregoing solution proposed by the invention can monitor in real time a varying difference of the radio frequency channel through the calibration error parameters and inspect in real time calibration precision by reporting the calibration error parameters. Furthermore, the foregoing solution proposed by the invention can adjust in real time a calibration period according to the calibration error parameters by shortening the calibration period for a rapidly varying radio frequency channel or lengthening the calibration period for a slowly varying radio frequency channel and perform in a timely way reasonable antenna calibration in view of the calibration precision. The foregoing solution proposed by the invention makes minor modifications to an existing system without any influence on compatibility of the system and is easy and efficient to implement.

Additional aspects and advantages of the invention will be presented in the following description, become apparent in the following description or be learned from the practice of the invention.

BRIEF DESCRIPTION OF THE DRAWINGS

The foregoing and/or additional aspects and advantages of the invention will become apparent and readily understood from the following description of the embodiments taken in connection with the drawings in which.

DETAILED DESCRIPTION OF THE EMBODIMENTS

Figure 1:
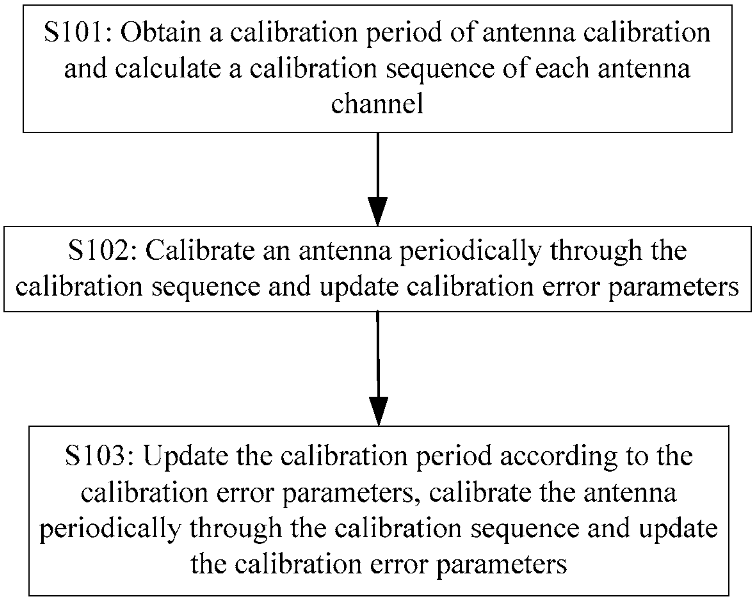
FIG. 1 and FIG. 3 are flow charts of an antenna calibrating method according to an embodiment of the invention.

The embodiments of the invention will be detailed below, and examples of the embodiments will be illustrated in the drawings throughout which identical or similar reference numerals represent identical or similar elements or elements with identical or similar functions. The embodiments to be described below with reference to the drawings are illustrative and merely intended to explain the invention but will not be construed as limiting the invention.

In order to achieve the object of the invention, the invention discloses an antenna calibrating method including the steps of: obtaining a calibration period T_i updated after previous antenna calibration and calculating a calibration sequence of each antenna channel in the calibration period T_i; calibrating each antenna in the calibration period T_i according to the calibration sequence of the each antenna channel and calculating calibration error parameters; and updating the calibration period T_i according to the obtained calibration error parameters, where the updated calibration period T_i is used for next antenna calibration.

For example, a calibration period T_i of antenna calibration is obtained and a calibration sequence of each antenna channel is calculated, where the calibration period T_i is a predetermined threshold A; an antenna is calibrated periodically in a period of T_i through the calibration sequence and calibration error parameters are updated; and a calibration period T_j of next calibration is updated according to the calibration error parameters and the T_i, the antenna is calibrated periodically in a period of T_j through the calibration sequence and the calibration error parameters are updated.

Reference is made to FIG. 1 illustrating a flow chart of an antenna calibrating method according to an embodiment of the invention, which includes the following steps.

The step S101 is to obtain a calibration period of antenna calibration and to calculate a calibration sequence of each antenna channel.

In the step S101, firstly a calibration period T_i of antenna calibration is obtained and a calibration sequence of each antenna channel is calculated, where the calibration period T_i is a predetermined threshold A, and obviously the threshold A can be set manually.

In the invention, antenna calibration includes two aspects of transmission calibration and reception calibration, and therefore periodical calibration includes periodical transmission calibration and periodical reception calibration, and correspondingly a calibration period includes a transmission calibration period and a reception calibration period.

The step S102 is to calibrate an antenna periodically through the calibration sequence and to update calibration error parameters.

In the step S102, an antenna is calibrated periodically in a period of T_i through the obtained calibration sequence and calibration error parameters are updated.

In the invention, the calibration error parameters include calibration coefficients, maximum amplitude deviations of the calibrated channel and maximum phase deviations of the calibrated channel, and particularly include parameters of two parts of transmission and reception.

The calibration coefficients include a transmission calibration coefficient $C_{TX}(n)$ and a reception calibration coefficient $C_{RX}(n)$, where n=1, 2, . . . , N, and N is the number of antenna radio frequency channels.

The maximum amplitude deviations of the calibrated channel include a maximum amplitude deviation $\epsilon_{TXAMPdB}$ of the transmission-calibrated channel and a maximum amplitude deviation $\epsilon_{RXAMPdB}$ of the reception-calibrated channel.

The maximum phase deviations of the calibrated channel include a maximum phase deviation $\epsilon_{TXPHZdeg}$ of the transmission-calibrated channel and a maximum phase deviation $\epsilon_{RXPHZdeg}$ of the reception-calibrated channel.

Processes of calibrating periodically the antenna and updating the calibration error parameters are included both in the step S102 and in the step S103, and methods for periodical calibration and for updating the calibration error parameters in the step S102 are consistent with those in the step S103 except for different input parameters, for example, the updated calibration error parameters or the updated calibration period, thereby generating different results. For the processes of calibrating periodically the antenna and updating the calibration error parameters in this step, reference can be made to corresponding parts of the step S103 so as to avoid a repeated description.

The step S103 is to update the calibration period according to the calibration error parameters, to calibrate the antenna periodically through the calibration sequence and to update the calibration error parameters.

In the step S103, a calibration period of next calibration is updated according to the calibration error parameters and the previous period, the antenna is calibrated periodically in the updated calibration period through the calibration sequence, and the calibration error parameters are updated.

Specifically, periodical transmission calibration includes:

respective signals $C_{TXI}(n)\cdot \underline{m}^n$ are transmitted over the respective antenna channels, where $C_{TXI}(n)$ is a calibration coefficient obtained in a previous calibration period, and $\underline{m}^n$ is a calibration sequence;

a transmission calibration coefficient of a current calibration period is calculated as $$C_{TX}(n) = C_{TXmodify}(n)\cdot C_{TXI}(n), \text{ where}$$

$$C_{TXmodify}(n) = \frac{\min(h_{max}^1, \ldots, h_{max}^N)}{h_{max}^n}, \; h_{max}^n = \max(h^n),$$

and $h^n$ is a channel characteristic of an antenna radio frequency channel n; and transmission calibration is performed on the antenna radio frequency channel n through the transmission calibration coefficient $C_{TX}(n)$.

Specifically, periodical reception calibration includes:

respective signals $C_{RXI}(n)\cdot \underline{m}^n$ are received over the respective antenna channels, where $C_{RXI}(n)$ is a calibration coefficient obtained in a previous calibration period, and $\underline{m}^n$ is a calibration sequence;

a reception calibration coefficient of a current calibration period is calculated as $C_{RX}(n)=C_{RXmodify}(n)\cdot C_{RXI}(n)$, where $$C_{RXmodify}(n) = \frac{\min(h_{max}^1, \ldots, h_{max}^N)}{h_{max}^n},$$

$h_{max}^n=\max(h^n)$, and $h^n$ is a channel characteristic of an antenna radio frequency channel n; and reception calibration is performed on the antenna radio frequency channel n through the reception calibration coefficient $C_{RX}(n)$.

In the foregoing embodiment, the calibration error parameters are updated as follows:

$$\varepsilon_{TXAMPdB} = \max\left(20\lg\left(\left|\frac{1}{C_{TXmodify}}\right|\right)\right) - \min\left(20\lg\left(\left|\frac{1}{C_{TXmodify}}\right|\right)\right);$$

$$\varepsilon_{TXPHZdeg} = \max\left(\arg\left(\left|\frac{1}{C_{TXmodify}}\right|\right)\right) - \min\left(\arg\left(\left|\frac{1}{C_{TXmodify}}\right|\right)\right);$$

$$\varepsilon_{RXAMPdB} = \max\left(20\lg\left(\left|\frac{1}{C_{RXmodify}}\right|\right)\right) - \min\left(20\lg\left(\left|\frac{1}{C_{RXmodify}}\right|\right)\right);$$

$$\text{and } \varepsilon_{RXPHZdeg} = \max\left(\arg\left(\frac{1}{C_{RXmodify}}\right)\right) - \min\left(\arg\left(\frac{1}{C_{RXmodify}}\right)\right).$$

Correspondingly, the calibration period of next transmission calibration is updated in the following ways.

With $\epsilon_{TXAMPdBInitial}<\epsilon_{TXAMPdB\_limit}$ and $\epsilon_{TXPHZdegInitial}<\epsilon_{TXPHZdeg\_limit}$, if $\epsilon_{TXAMPdB}<\epsilon_{TXAMPdB\_limit}$ and $\epsilon_{TXPHZdeg}<\epsilon_{TXPHZdeg\_limit}$, the calibration period of transmission calibration is Tj_TX=k*Ti_TX; otherwise, the calibration period of transmission calibration is kept unchanged as Tj_TX=Ti_TX.

With $\epsilon_{TXAMPdBInitial}\geq\epsilon_{TXAMPdB\_limit}$ or $\epsilon_{TXPHZdegInitial}\geq\epsilon_{TXPHZdeg\_limit}$, if $\epsilon_{TXAMPdB}<\epsilon_{TXAMPdB\_limit}$ and $\epsilon_{TXPHZdeg}<\epsilon_{TXPHZdeg\_limit}$, the calibration period of transmission calibration is kept unchanged as Tj_TX=Ti_TX; otherwise, the calibration period of transmission calibration is Tj_TX=Ti_TX/k, where $\epsilon_{TXAMPdBInitial}$ and $\epsilon_{TXPHZdegInitial}$ are non-updated calibration parameters $\epsilon_{TXAMPdB}$ and $\epsilon_{TXPHZdeg}$ are updated calibration parameters, $\epsilon_{TXAMPdB\_limit}$ and $\epsilon_{TXPHZdeg\_limit}$ are thresholds of permissible maximum calibration parameters, and k>=1.

Correspondingly, the calibration period of next reception calibration is updated in the following ways.

With $\epsilon_{RXAMPdBInitial}<\epsilon_{RXAMPdB\_limit}$ and $\epsilon_{XPHZdegInitial}<\epsilon_{RXPHZdeg\_limit}$, if $\epsilon_{RXAMPdB}<\epsilon_{RXAMPdB\_limit}$ and $\epsilon_{RXPHZdeg}<\epsilon_{RXPHZdeg\_limit}$, the calibration period of reception calibration is Tj_RX=k*Ti_RX; otherwise, the calibration period of reception calibration is kept unchanged as Tj_RX=Ti_RX.

With $\epsilon_{RXAMPdBInitial}\geq\epsilon_{RXAMPdB\_limit}$ or $\epsilon_{RXPHZdegInitial}\geq\epsilon_{RXPHZdeg\_limit}$, if $\epsilon_{RXAMPdB}<\epsilon_{RXAMPdB\_limit}$ and $\epsilon_{RXPHZdeg}<\epsilon_{RXPHZdeg\_limit}$, the calibration period of reception calibration is kept unchanged as Tj_RX=Ti_RX; otherwise, the calibration period of reception calibration is Tj_RX=Ti_RX/k, where $\epsilon_{RXAMPdBInitial}$ and $\epsilon_{RXPHZdegInitial}$ are non-updated calibration parameters, $\epsilon_{RXAMPdB}$ and $\epsilon_{RXPHZdeg}$ are updated calibration parameters, $\epsilon_{RXAMPdB\_limit}$ and $\epsilon_{RXPHZdeg\_limit}$ are thresholds of permissible maximum calibration parameters, and k>=1.

Figure 2:
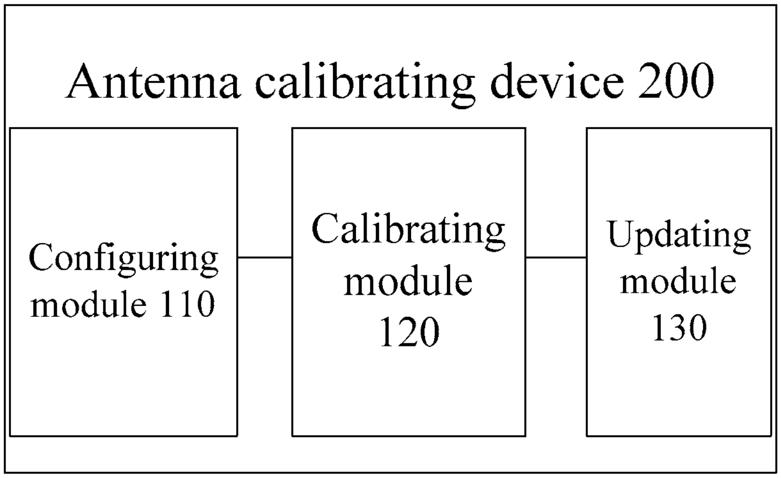
FIG. 2 and FIG. 4 are schematic structural diagrams of an antenna calibrating device according to an embodiment of the invention.

Reference is made to FIG. 2 illustrating a schematic structural diagram of an antenna calibrating device 100 according to an embodiment of the invention, which includes a configuring module 110, a calibrating module 120 and an updating module 130.

The configuring module 110 is configured to configure a calibration period T_i of antenna calibration, where the calibration period T_i is a predetermined threshold A.

The calibrating module 120 is configured to calculate a calibration sequence of each antenna channel, and to calibrate an antenna periodically in a period of T_i and calibrate the antenna periodically in an updated period through the calibration sequence.

Specifically, periodical calibration by the calibrating module 120 includes periodical transmission calibration and periodical reception calibration, and the calibration period includes a transmission calibration period and a reception calibration period.

Specifically, the periodical transmission calibration by the calibrating module 120 includes:

respective signals $C_{TXI}(n)\cdot \underline{m}^n$ are transmitted over the respective antenna channels, where $C_{TXI}(n)$ is a calibration coefficient obtained in a previous calibration period, and $m^n$ is a calibration sequence;

the calibrating module 120 calculates a transmission calibration coefficient of a current calibration period as $C_{TX}(n)=C_{TXmodify}(n)\cdot C_{TXI}(n)$, where $$C_{TXmodify}(n) = \frac{\min(h_{max}^1, \ldots, h_{max}^N)}{h_{max}^n},$$

$h_{max}^n=\max(h^n)$, and $h^n$ is a channel characteristic of an antenna radio frequency channel n; and the calibrating module 120 performs transmission calibration on the antenna radio frequency channel n through the transmission calibration coefficient $C_{TX}(n)$.

Periodical reception calibration by the calibrating module 120 includes:

respective signals $C_{RXI}(n)\cdot \underline{m}^n$ are received over the respective antenna channels, where $C_{RXI}(n)$ is a calibration coefficient obtained in a previous calibration period, and $m^n$ is a calibration sequence;

the calibrating module 120 calculates a reception calibration coefficient of a current calibration period as $C_{RX}(n)=C_{RXmodify}(n)\cdot C_{RXI}(n)$, where $$C_{RXmodify}(n)=\frac{\min(h_{max}^{1},\ \ldots\ ,h_{max}^{N})}{h_{max}^{n}},$$

$h_{max}^{n}=\max(h^{n})$, and $h^{n}$ is a channel characteristic of an antenna radio frequency channel n; and the calibrating module 120 performs reception calibration on the antenna radio frequency channel n through the reception calibration coefficient $C_{RX}(n)$.

The updating module 130 is configured to update calibration error parameters and to update a calibration period T_j of next calibration according to the calibration error parameters and the T_i.

Specifically, the calibration error parameters updated by the updating module 130 include calibration coefficients, maximum amplitude deviations of the calibrated channel and maximum phase deviations of the calibrated channel.

The calibration coefficients include a transmission calibration coefficient $C_{TX}(n)$ and a reception calibration coefficient $C_{RX}(n)$, where n=1, 2, . . . , N, and N is the number of antenna radio frequency channels.

The maximum amplitude deviations of the calibrated channel include a maximum amplitude deviation $\epsilon_{TXAMPdB}$ of the transmission-calibrated channel and a maximum amplitude deviation $\epsilon_{RXAMPdB}$ of the reception-calibrated channel.

The maximum phase deviations of the calibrated channel include a maximum phase deviation $\epsilon_{TXPHZdeg}$ of the transmission-calibrated channel and a maximum phase deviation $\epsilon_{RXPHZdeg}$ of the reception-calibrated channel.

Specifically, updating of the calibration error parameters by the updating module 130 includes:

$$\varepsilon_{TXAMPdB}=\max\left(20\lg\left(\left|\frac{1}{C_{TXmodify}}\right|\right)\right)-\min\left(20\lg\left(\left|\frac{1}{C_{TXmodify}}\right|\right)\right);$$

$$\varepsilon_{TXPHZdeg}=\max\left(\arg\left(\left|\frac{1}{C_{TXmodify}}\right|\right)\right)-\min\left(\arg\left(\left|\frac{1}{C_{TXmodify}}\right|\right)\right);$$

$$\varepsilon_{RXAMPdB}=\max\left(20\lg\left(\left|\frac{1}{C_{RXmodify}}\right|\right)\right)-\min\left(20\lg\left(\left|\frac{1}{C_{RXmodify}}\right|\right)\right);$$

$$\text{and }\varepsilon_{RXPHZdeg}=\max\left(\arg\left(\frac{1}{C_{RXmodify}}\right)\right)-\min\left(\arg\left(\frac{1}{C_{RXmodify}}\right)\right).$$

Specifically, updating of the calibration period of next calibration by the updating module 130 includes:

the calibration period of next transmission calibration is updated:

with $\epsilon_{TXAMPdBInitial}<\epsilon_{TXAMPdB\_limit}$ and $\epsilon_{TXPHZdegInitial}<\epsilon_{TXPHZdeg\_limit}$, if $\epsilon_{TXAMPdB}<\epsilon_{TXAMPdB\_limit}$ and $\epsilon_{TXPHZdeg}<\epsilon_{TXPHZdeg\_limit}$, the calibration period of transmission calibration is Tj_TX=k*Ti_TX; otherwise, the calibration period of transmission calibration is kept unchanged as Tj_TX=Ti_TX; and with $\epsilon_{TXAMPdBInitial}\geq\epsilon_{TXAMPdB\_limit}$ or $\epsilon_{TXPHZdegInitial}\geq\epsilon_{TXPHZdeg\_limit}$, if $\epsilon_{TXAMPdB}<\epsilon_{TXAMPdB\_limit}$ and $\epsilon_{TXPHZdeg}<\epsilon_{TXPHZdeg\_limit}$, the calibration period of transmission calibration is kept unchanged as Tj_TX=Ti_TX; otherwise, the calibration period of transmission calibration is Tj_TX=Ti_TX/k, where $\epsilon_{TXAMPdBInitial}$ and $\epsilon_{TXPHZdegInitial}$ are non-updated calibration parameters, $\epsilon_{TXAMPdB}$ and $\epsilon_{TXPHZdeg}$ are updated calibration parameters, $\epsilon_{TXAMPdB\_limit}$ and $\epsilon_{TXPHZdeg\_limit}$ are thresholds of permissible maximum calibration parameters, and k>=1; and the calibration period of next reception calibration is updated:

with $\epsilon_{RXAMPdBInitial}<\epsilon_{RXAMPdB\_limit}$ and $\epsilon_{RXPHZdegInitial}<\epsilon_{RXPHZdeg\_limit}$, if $\epsilon_{RXAMPdB}<\epsilon_{RXAMPdB\_limit}$ and $\epsilon_{RXPHZdeg}<\epsilon_{RXPHZdeg\_limit}$, the calibration period of reception calibration is Tj_RX=k*Ti_RX; otherwise, the calibration period of reception calibration is kept unchanged as Tj_RX=Ti_RX; and with $\epsilon_{RXAMPdBInitial}\geq\epsilon_{RXAMPdB\_limit}$ or $\epsilon_{RXPHZdegInitial}\geq\epsilon_{RXPHZdeg\_limit}$, if $\epsilon_{RXAMPdB}<\epsilon_{RXAMPdB\_limit}$ and $\epsilon_{RXPHZdeg}<\epsilon_{RXPHZdeg\_limit}$, the calibration period of reception calibration is kept unchanged as Tj_RX=Ti_RX; otherwise, the calibration period of reception calibration is Tj_RX=Ti_RX/k, where $\epsilon_{RXAMPdBInitial}$ and $\epsilon_{RXPHZdegInitial}$ are non-updated calibration parameters, $\epsilon_{RXAMPdB}$ and $\epsilon_{RXPHZdeg}$ are updated calibration parameters, $\epsilon_{RXAMPdB\_limit}$ and $\epsilon_{RXPHZdeg\_limit}$ are thresholds of permissible maximum calibration parameters, and k>=1.

In order to further set forth the invention, complete flows of transmission calibration and reception calibration will be exemplified respectively below in connection with more particular parameters. It shall be noted that the order of steps in the following embodiment will not limit the invention and some of the steps can be performed in a reversed order as long as the object of the invention can be achieved.

In a first step, an initial calibration period is set, for example, calibration periods of transmission calibration and reception calibration take values of T_TX=5 s, T_RX=5 s. Obviously the initial calibration period can be set manually.

In a second step, a calibration sequence of each channel is calculated.

(1) Assumed the length of a channel estimation window required for each radio frequency channel is W and the number of antenna radio frequency channels is N, so P of a binary basic sequence is P=W*N, and the binary basic sequence is represented as:

$$m_{basic}=(m_1,m_2,\ \ldots\ ,m_P),\text{ where }P=W*N.$$

The binary basic sequence $m_{basic}$ is phase-equalized into a new complex basic sequence $\underline{m}_{basic}$ represented as:

$$\underline{m}_{basic}=(\underline{m}_1,\underline{m}_2,\ \ldots\ ,\underline{m}_P),\text{ where P=W*N,}$$

$$\text{where }\underline{m}_i=(j)^{i-1}\cdot m_i,\text{ where }i=1,\ \ldots\ ,P.$$

(2) The complex basic sequence $\underline{m}_{basic}$ is extended periodically into a periodical extended sequence $\underline{m}_{periodic}$ represented as:

$$\begin{aligned}\underline{m}_{periodic}&=(\underline{m}_1,\underline{m}_2,\ \cdots\ ,\underline{m}_{Imax})\quad;\\&=([\underline{m}_{basic}((I+1)P-Imax+1:P)]_1,\ \cdots\ ,\\&\quad[\underline{m}_{basic}(1:P)]_{I+1})\end{aligned}$$

where $$Lm=P+W-1,\ Imax=Lm+(N-1)W\text{ and }I=\left\lfloor\frac{Imax}{P}\right\rfloor.$$

(3) A calibration sequence of each channel is calculated as:

$$\begin{aligned}\underline{m}^n &= (\underline{m}_1^n, \underline{m}_2^n, \ldots, \underline{m}_{Lm}^n);\\ &= \underline{m}_{periodic}(Imax-(n-1)W-Lm+1;\ Imax-(n-1)W)\\ &= \underline{m}_{periodic}((N-n)W+1 : Lm+(N-n)W)\\ &= (\underline{m}_{(N-n)W+1}, \underline{m}_{(N-n)W+2}, \ldots, \underline{m}_{Lm+(N-n)W})\end{aligned}$$

where Lm=P+W−1 and n=1, 2, . . . , N.

In a third step, periodical transmission calibration is performed.

(a) Variables are initialized.

A permissible maximum amplitude deviation $\epsilon_{TXAMPdB\_limit}$ of the channel and a maximum phase deviation $\epsilon_{TXPHZdeg\_limit}$ of the channel can be set as required for performance, for example, $\epsilon_{TXAMPdB\_limit}=0.3$ and $\epsilon_{TXPHZdeg\_limit}=3$.

Three stored variables will be defined prior to periodical transmission calibration: a coefficient of previous periodical transmission calibration $C_{TXInitial}$, a maximum amplitude deviation $\epsilon_{TXAMPdBInitial}$ of the channel after previous periodical transmission calibration and a maximum phase deviation $\epsilon_{TXPHZdegInitial}$ of the channel after previous periodical transmission calibration.

The variables are initialized: $C_{TXInitial}=[1, \ldots, 1]_{1\times N}$, $\epsilon_{TXAMPdBInitial}=0$ and $\epsilon_{TXPHZdegInitial}=0$.

(b) Parameters of current periodical transmission calibration $C_{TXmodify}$, $C_{TX}$, $\epsilon_{TXAMPdB}$ and $\epsilon_{TXPHZdeg}$ are calculated.

First transmission calibration is performed as required for the initial calibration period T_TX, and respective sequences $C_{TXInitial}(n)\cdot\underline{m}^n$ are transmitted over the respective channels and received over a calibration channel into a signal of:

$$\underline{e}_m=(\underline{e}_1,\underline{e}_2, \ldots, \underline{e}_{Lm});$$

A cyclically shifted part is removed, thus leaving $e_m$ with the length of P and represented as:

$$e_m=(e_1,e_2, \ldots, e_p)=(\underline{e}_{w-1},\underline{e}_w, \ldots \underline{e}_{w+P-2});$$

Radio frequency channel estimation is performed:

$$\underline{h}=(\underline{h}_1,\underline{h}_2, \ldots \underline{h}_P)=ifft(fft(e_m)./fft(\underline{m}_{basic}));$$

A channel characteristic of each channel is obtained according to the window length of the channel as:

$$h^n=(h_1,h_2, \ldots, h_W)=(\underline{h}_{(n-1)W+1},\underline{h}_{(n-1)W+2}, \ldots \underline{h}_{(n-1)W+W}).$$

Assumed $h_{max}^{n}=\max(h^n)$;

Referring to the channel with the worst signal power among the N channels, a modification coefficient of current periodical transmission calibration is calculated as:

$$C_{TXmodify}(n) = \frac{\min(h_{max}^1, \ldots, h_{max}^N)}{h_{max}^n};$$

then a coefficient of current periodical transmission calibration is $C_{TX}=C_{TXmodify}\cdot C_{TXInitial}$.

A maximum amplitude deviation $\epsilon_{TXAMPdB}$ and a maximum phase deviation $\epsilon_{TXPHZdeg}$ of the channel after current periodical calibration are set as follows:

If this is the first periodical calibration, $\epsilon_{TXAMPdB}=\epsilon_{TXAMPdBInitial}$ and $\epsilon_{TXPHZdeg}=\epsilon_{TXPHZdegInitial}$;

Otherwise, $$\varepsilon_{TXAMPdB} = \max\left(20lg\left(\left|\frac{1}{C_{TXmodify}}\right|\right)\right) - \min\left(20lg\left(\left|\frac{1}{C_{TXmodify}}\right|\right)\right);\text{ and}$$

$$\varepsilon_{TXPHZdeg} = \max\left(\arg\left(\frac{1}{C_{TXmodify}}\right)\right) - \min\left(\arg\left(\frac{1}{C_{TXmodify}}\right)\right).$$

(c) The calibration period is adjusted.

A calibration period adjusting factor k is set, with $\epsilon_{TXAMPdBInitial}<\epsilon_{TXAMPdB\_limit}$ and $\epsilon_{TXPHZdegInitial}<\epsilon_{TXPHZdeg\_limit}$, if $\epsilon_{TXAMPdR}<\epsilon_{TXAMPdB\_limit}$ and $\epsilon_{TXPHZdeg}<\epsilon_{TXPHZdeg\_limit}$, the calibration period of transmission calibration is T_TX=k*T_TX; otherwise, the calibration period of transmission calibration is kept unchanged as T_TX=T_TX; and with $\epsilon_{TXAMPdBInitial}\geq\epsilon_{TXAMPdB\_limit}$ or $\epsilon_{TXPHZdegInitial}\geq\epsilon_{TXPHZdeg\_limit}$, if $\epsilon_{TXAMPdb}<\epsilon_{TXAMPdb\_limit}$ and $\epsilon_{TXPHZdeg}<\epsilon_{TXPHZdeg\_limit}$, the calibration period of transmission calibration is kept unchanged as T_TX=T_TX; otherwise, the calibration period of transmission calibration is T_TX=T_TX/k. Furthermore, let T_TX=5s when T_TX<5s, that is, less than the predetermined period.

(d) Data is updated and stored.

$C_{TXInitial}=C_{TX}$, $\epsilon_{TXAMPdBInitial}=\epsilon_{TXAMPdB}$ and $\epsilon_{TXPHZdegInitial}=\epsilon_{TXPHZdeg}$; and the deviations $\epsilon_{TXAMPdBInitial}$ and $\epsilon_{TXPHZdegInitial}$ are reported.

(e) Next periodical calibration is performed according to the new calibration period T_TX, and the flow returns to the process of (b).

In a fourth step, periodical reception calibration is performed.

(a) Variables are initialized.

A permissible maximum amplitude deviation $\epsilon_{RXAMPdB\_limit}$ of the channel and a maximum phase deviation $\epsilon_{RXPHZdeg\_limit}$ of the channel can be set as required for performance, for example, $\epsilon_{RXAMPdB\_limit}=0.3$ and $\epsilon_{RXPHZdeg\_limit}=3$.

Three stored variables will be defined prior to periodical reception calibration: a coefficient of previous periodical reception calibration $C_{RXInitial}$, a maximum amplitude deviation $\epsilon_{RXAMPdBInitial}$ of the channel after previous periodical reception calibration and a maximum phase deviation $\epsilon_{RXPHZdegInitial}$ of the channel after previous periodical reception calibration. The variables are initialized: $C_{RXInitial}=[1, \ldots, 1]_{1\times N}$, $\epsilon_{RXAMPdBInitial}=0$ and $\epsilon_{RXPHZdegInitial}=0$.

(b) Parameters of current periodical reception calibration $C_{RXmodify}$, $C_{RX}$, $\epsilon_{RXAMPdB}$ and $\epsilon_{RXPHZdeg}$ are calculated.

First reception calibration is performed as required for the initial calibration period T_RX, and sequences $C_{RXInitial}(n)\cdot\underline{m}^1$ are transmitted respectively over a calibration channel and received over respective RX channels as:

$$\underline{e}_m^{\ n}=(\underline{e}_1^{\ n},\underline{e}_2^{\ n}, \ldots, \underline{e}_{Lm}^{\ n});$$

A cyclically shifted part is removed, thus leaving $e_m$ with the length of P and represented as:

$$\underline{e}_m^{\ n}=(e_1^{\ n},e_2^{\ n}, \ldots, e_P^{\ n})=(\underline{e}_{w-1}^{\ n},\underline{e}_w^{\ n}, \ldots, \underline{e}_{w+P-2}^{\ n});$$

Radio frequency channel estimation is performed:

$$\underline{h}^n=(\underline{h}_1^{\ n},\underline{h}_2^{\ n}, \ldots \underline{h}_P^{\ n})=ifft(fft(e_m^{\ n})./fft(m_{basic}));$$

A channel characteristic of each channel is obtained according to the window length of the channel as:

$$h^n=(h_1,h_2, \ldots, h_W)=(\underline{h}_{(n-1)W+1},\underline{h}_{(m-1)W+2}, \ldots \underline{h}_{(n-1)W+W}).$$

Assumed $h_{max}^n = \max(h^n)$;

referring to the channel with the worst signal power among the N channels, a modification coefficient of current periodical reception calibration is calculated as:

$$C_{RXmodify}(n) = \frac{\min(h_{max}^1, \ldots, h_{max}^N)}{h_{max}^n}.$$

Then a coefficient of current periodical reception calibration is $C_{RX} = C_{RXmodify} \cdot C_{RXInitial}$.

A maximum amplitude deviation $\epsilon_{RXAMPdB}$ and a maximum phase deviation $\epsilon_{RXPHZdeg}$ of the channel after current periodical calibration are set as follows:

if this is the first periodical calibration, and $\epsilon_{RXAMPdB} = \epsilon_{RXAMPdBInitial}$;

otherwise, $$\varepsilon_{RXAMPdB} = \max\left(20lg\left(\left|\frac{1}{C_{RXmodify}}\right|\right)\right) - \min\left(20lg\left(\left|\frac{1}{C_{RXmodify}}\right|\right)\right);\text{ and}$$

$$\varepsilon_{RXPHZdeg} = \max\left(\arg\left(\frac{1}{C_{RXmodify}}\right)\right) - \min\left(\arg\left(\frac{1}{C_{RXmodify}}\right)\right).$$

(c) The calibration period is adjusted.

A calibration period adjusting factor k is set, with $\epsilon_{RXAMPdBInitial} < \epsilon_{RXAMPdB\_limit}$ and $\epsilon_{RXPHZdegInitial} < \epsilon_{RXPHZdeg\_limit}$, if $\epsilon_{RXAMPdB} < \epsilon_{RXAMPdB\_limit}$ and $\epsilon_{RXPHZdeg} < \epsilon_{RXPHZdeg\_limit}$, the calibration period of reception calibration is k times the original one as T_RX=k*T_RX; otherwise, the calibration period of reception calibration is kept unchanged as T_RX=T_RX; and with $\epsilon_{RXAMPdBInitial} \geq \epsilon_{RXAMPdB\_limit}$ or $\epsilon_{RXPHZdegInitial} \geq \epsilon_{RXPHZdeg\_limit}$, if $\epsilon_{RXAMPdB} < \epsilon_{RXAMPdB\_limit}$ and $\epsilon_{RXPHZdeg} < \epsilon_{RXPHZdeg\_limit}$, the calibration period of reception calibration is kept unchanged as T_RX=T_RX; otherwise, the calibration period of reception calibration is 1/k time the original one as T_RX=T_RX/k. Furthermore, let T_RX=5 s when T_RX<5 s, that is, less than the predetermined period.

(d) Data is updated and stored.

$C_{RXInitial} = C_{RX}$, $\epsilon_{RXAMPdBInitial} = \epsilon_{RXAMPdB}$ and $\epsilon_{RXPHZdegInitial} = \epsilon_{RXPHZdeg}$; and the deviations $\epsilon_{RXAMPdBInitial}$ and $\epsilon_{RXPHZdegInitial}$ are reported.

(e) Next periodical calibration is performed according to the new calibration period T_RX, and the flow returns to the process of (b).

Figure 3:
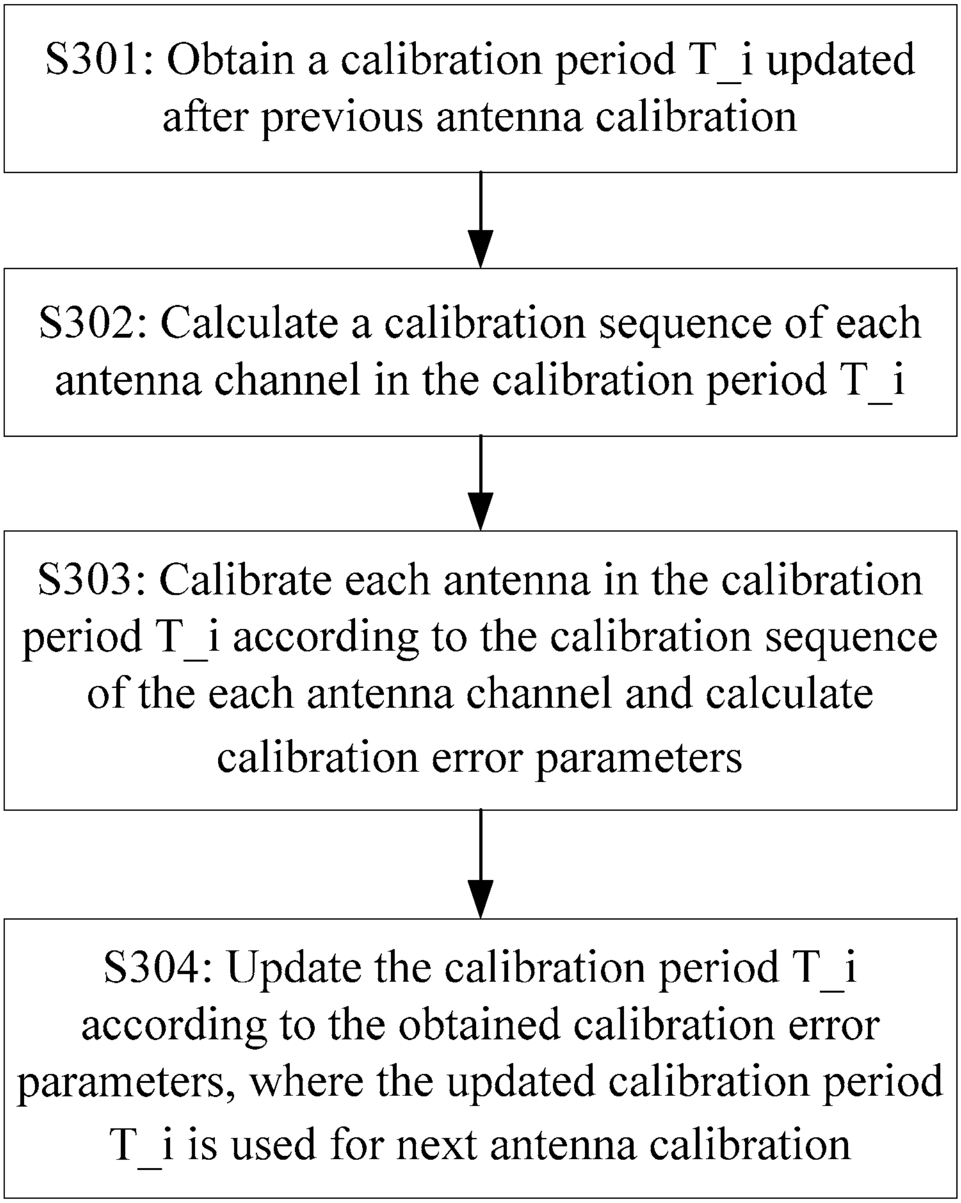

In summary, referring to FIG. 3, each antenna calibration in an embodiment of the invention includes the following steps.

The Step S301 is to obtain a calibration period T_i updated after previous antenna calibration.

The Step S302 is to calculate a calibration sequence of each antenna channel in the calibration period T_i.

The Step S303 is to calibrate each antenna in the calibration period T_i according to the calibration sequence of the each antenna channel and to calculate calibration error parameters.

The Step S304 is to update the calibration period T_i according to the obtained calibration error parameters, where the updated calibration period T_i is used for next antenna calibration.

In the step S303, calibration of each antenna includes transmission calibration and reception calibration, and the calibration period T_i includes a transmission calibration period and a reception calibration period.

The calibration error parameters include calibration coefficients, maximum amplitude deviations of the calibrated channel and maximum phase deviations of the calibrated channel.

The calibration coefficients include a transmission calibration coefficient $C_{TX}(n)$ and a reception calibration coefficient $C_{RX}(n)$, where n=1, 2, . . . , N, and N is the number of antenna radio frequency channels.

The maximum amplitude deviations of the calibrated channel include a maximum amplitude deviation $\epsilon_{TXAMPdB}$ of the transmission-calibrated channel and a maximum amplitude deviation $\epsilon_{RXAMPdB}$ of the reception-calibrated channel.

The maximum phase deviations of the calibrated channel include a maximum phase deviation $\epsilon_{TXPHZdeg}$ of the transmission-calibrated channel and a maximum phase deviation $\epsilon_{RXPHZdeg}$ of the reception-calibrated channel.

In the step S303, transmission calibration includes:

respective signals $C_{TXI}(n) \cdot \underline{m}^n$ are transmitted over the respective antenna channels, where $C_{TXI}(n)$ is a calibration coefficient obtained in a previous calibration period, and $\underline{m}^n$ is a calibration sequence;

the transmission calibration coefficient of the calibration period T_i is calculated as $C_{TX}(n) = C_{TXmodify}(n) \cdot C_{TXI}(n)$, where $$C_{TXmodify}(n) = \frac{\min(h_{max}^1, \ldots, h_{max}^N)}{h_{max}^n},$$

$h_{max}^n = \max(h^n)$, and $h^n$ is a channel characteristic of an antenna radio frequency channel n; and transmission calibration is performed on the antenna radio frequency channel n through the transmission calibration coefficient $C_{TX}(n)$.

In the step S303, reception calibration includes:

respective signals $C_{RXI}(n) \cdot \underline{m}^n$ are received over the respective antenna channels, where $C_{RXI}(n)$ is a calibration coefficient obtained in a previous calibration period, and $\underline{m}^n$ is a calibration sequence;

the reception calibration coefficient of the calibration period T_i is calculated as $C_{RX}(n) = C_{RXmodify}(n) \cdot C_{RXI}(n)$, where $$C_{RXmodify}(n) = \frac{\min(h_{max}^1, \ldots, h_{max}^N)}{h_{max}^n},$$

$h_{max}^n = \max(h^n)$, and $h^n$ is a channel characteristic of an antenna radio frequency channel n; and reception calibration is performed on the antenna radio frequency channel n through the reception calibration coefficient $C_{RX}(n)$.

In the step 303, calculation of the calibration error parameters includes:

$$\varepsilon_{TXAMPdB} = \max\left(20lg\left(\left|\frac{1}{C_{TXmodify}}\right|\right)\right) - \min\left(20lg\left(\left|\frac{1}{C_{TXmodify}}\right|\right)\right);$$

$$\varepsilon_{TXPHZdeg} = \max\left(\arg\left(\frac{1}{C_{TXmodify}}\right)\right) - \min\left(\arg\left(\frac{1}{C_{TXmodify}}\right)\right);$$

$$\varepsilon_{RXAMPdB} = \max\left(20lg\left(\left|\frac{1}{C_{RXmodify}}\right|\right)\right) - \min\left(20lg\left(\left|\frac{1}{C_{RXmodify}}\right|\right)\right);\text{ and}$$

-continued $$\varepsilon_{RXPHZdeg} = \max\left(\arg\left(\frac{1}{C_{RXmodify}}\right)\right) - \min\left(\arg\left(\frac{1}{C_{RXmodify}}\right)\right).$$

In the step S304, updating of the calibration period T_i includes:

the transmission calibration period included in the current calibration period T_i is updated:

with $\epsilon_{TXAMPdBInitial} < \epsilon_{TXAMPdB\_limit}$ and $\epsilon_{TXPHZdegInitial} < \epsilon_{TXPHZdeg\_limit}$, if $\epsilon_{TXAMPdB} < \epsilon_{TXAMPdB\_limit}$ and $\epsilon_{TXPHZdeg} < \epsilon_{TXPHZdeg}$, the transmission calibration period is updated to Ti_TX=k*Ti_TX; otherwise, the transmission calibration period is kept unchanged as Ti_TX=Ti_TX; and with $\epsilon_{TXAMPdBInitial} \geq \epsilon_{TXAMPdB\_limit}$ or $\epsilon_{TXPHZdegInitial} \geq \epsilon_{TXPHZdeg\_limit}$, if $\epsilon_{TXAMPdB} < \epsilon_{TXAMPdB\_limit}$ and $\epsilon_{TXPHZdeg} < \epsilon_{TXPHZdeg\_limit}$, the transmission calibration period is kept unchanged as Ti_TX=Ti_TX; otherwise, the transmission calibration period is updated to Ti_TX=Ti_TX/k, where $\epsilon_{TXAMPdBInitial}$ and $\epsilon_{TXPHZdegInitial}$ are non-updated calibration parameters, $\epsilon_{TXAMPdB}$ and $\epsilon_{TXPHZdeg}$ are updated calibration parameters, $\epsilon_{TXAMPdB\_limit}$ and $\epsilon_{TXPHZdeg\_limit}$ are thresholds of permissible maximum calibration parameters, k>=1, and Ti_TX is a previously used transmission calibration period; and the reception calibration period included in the current calibration period T_i is updated:

with $\epsilon_{RXAMPdBInitial} < \epsilon_{RXAMPdB\_limit}$ and $\epsilon_{RXPHZdegInitial} < \epsilon_{RXPHZdeg\_limit}$, if $\epsilon_{RXAMPdB} < \epsilon_{RXAMPdB\_limit}$ and $\epsilon_{RXPHZdeg} < \epsilon_{RXPHZdeg\_limit}$, the reception calibration period is updated to Ti_RX=k*Ti_RX; otherwise, the reception calibration period is kept unchanged as Ti_RX=Ti_RX; and with $\epsilon_{RXAMPdBInitial} \geq \epsilon_{RXAMPdB\_limit}$ or $\epsilon_{RXPHZdegInitial} \geq \epsilon_{RXPHZdeg\_limit}$, if $\epsilon_{RXAMPdB} < \epsilon_{RXAMPdB\_limit}$ and $\epsilon_{RXPHZdeg} < \epsilon_{RXPHZdeg\_limit}$, the reception calibration period is kept unchanged as Ti_RX=Ti_RX; otherwise, the reception calibration period is updated to Ti_RX=Ti_RX/k, where $\epsilon_{RXAMPdBInitial}$ and $\epsilon_{RXPHZdegInitial}$ are non-updated calibration parameters, $\epsilon_{RXAMPdB}$ and $\epsilon_{RXPHZdeg}$ are updated calibration parameters, $\epsilon_{RXAMPdB\_limit}$ and $\epsilon_{RXPHZdeg\_limit}$ are thresholds of permissible maximum calibration parameters, and k>=1.

Figure 4:
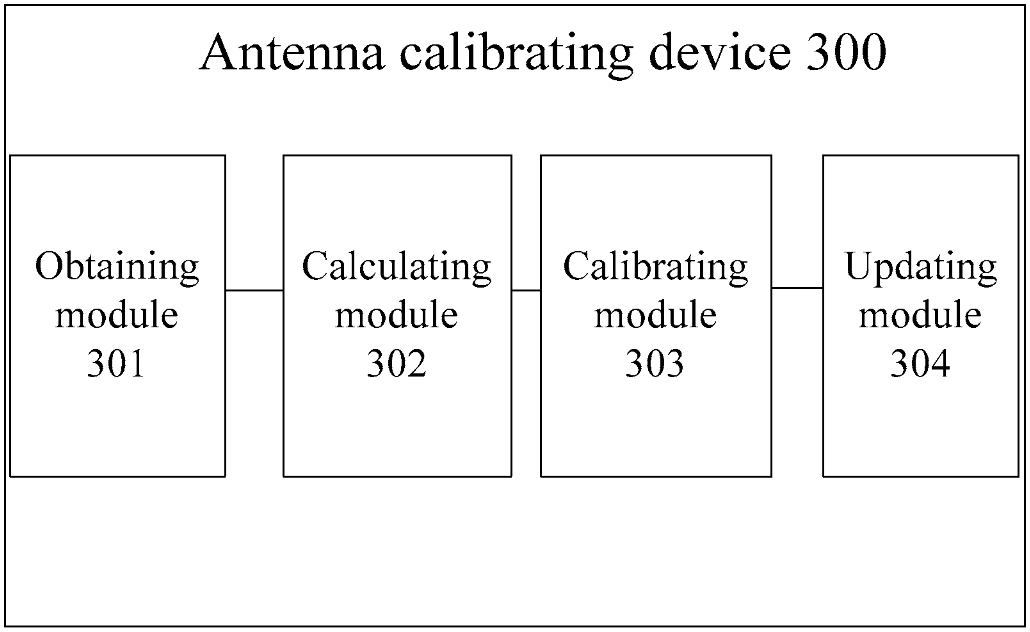

Correspondingly, referring to FIG. 4, an antenna calibrating device according to an embodiment of the invention includes:

an obtaining module 301 configured to obtain a calibration period T_i updated after previous antenna calibration;

a calculating module 302 configured to calculate a calibration sequence of each antenna channel in the calibration period T_i;

a calibrating module 303 configured to calibrate each antenna in the calibration period T_i according to the calibration sequence of the each antenna channel and to calculate calibration error parameters; and an updating module 304 configured to update the calibration period T_i according to the obtained calibration error parameters, where the updated calibration period T_i is used for next antenna calibration.

Calibration of each antenna by the calibrating module 303 includes transmission calibration and reception calibration, and the calibration period T_i includes a transmission calibration period and a reception calibration period.

The calibration error parameters calculated by the calibrating module 303 include calibration coefficients, maximum amplitude deviations of the calibrated channel and maximum phase deviations of the calibrated channel.

The calibration coefficients include a transmission calibration coefficient $C_{TX}(n)$ and a reception calibration coefficient $C_{RX}(n)$, where n=1, 2, . . . , N, and N is the number of antenna radio frequency channels.

The maximum amplitude deviations of the calibrated channel include a maximum amplitude deviation $\epsilon_{TXAMPdB}$ of the transmission-calibrated channel and a maximum amplitude deviation $\epsilon_{RXAMPdB}$ of the reception-calibrated channel.

The maximum phase deviations of the calibrated channel include a maximum phase deviation $\epsilon_{TXPHZdeg}$ of the transmission-calibrated channel and a maximum phase deviation $\epsilon_{RXPHZdeg}$ of the reception-calibrated channel.

Transmission calibration by the calibrating module 303 includes:

respective signals $C_{TXI}(n)\cdot\underline{m}^n$ are transmitted over the respective antenna channels, where $C_{TXI}(n)$ is a calibration coefficient obtained in a previous calibration period, and $\underline{m}^n$ is a calibration sequence;

the calibrating module calculates the transmission calibration coefficient of the calibration period T_i as $C_{TX}(n) = {}_{TXmodify}(n) \cdot C_{TXI}(n)$, where $$C_{TXmodify}(n) = \frac{\min(h_{max}^1, \ldots, h_{max}^N)}{h_{max}^n},$$

$h_{max}^n = \max(h^n)$, and $h^n$ is a channel characteristic of an antenna radio frequency channel n; and the calibrating module performs transmission calibration on the antenna radio frequency channel n through the transmission calibration coefficient $C_{TX}(n)$.

Reception calibration by the calibrating module 303 includes:

respective signals $C_{RXI}(n)\cdot\underline{m}^n$ are received over the respective antenna channels, where $C_{RXI}(n)$ is a calibration coefficient obtained in a previous calibration period, and $\underline{m}^n$ is a calibration sequence;

the calibrating module 303 calculates the reception calibration coefficient of the calibration period T_i as $C_{RX}(n) = C_{RXmodify}(n) \cdot C_{RXI}(n)$, where $$C_{RXmodify}(n) = \frac{\min(h_{max}^1, \ldots, h_{max}^N)}{h_{max}^n},$$

$h_{max}^n = \max(h^n)$, and $h^n$ is a channel characteristic of an antenna radio frequency channel n; and the calibrating module 303 performs reception calibration on the antenna radio frequency channel n through the reception calibration coefficient $C_{RX}(n)$.

Calculation of the calibration error parameters by the calibrating module 303 includes:

$$\varepsilon_{TXAMPdB} = \max\left(20lg\left(\left|\frac{1}{C_{TXmodify}}\right|\right)\right) - \min\left(20lg\left(\left|\frac{1}{C_{TXmodify}}\right|\right)\right);$$

$$\varepsilon_{TXPHZdeg} = \max\left(\arg\left(\frac{1}{C_{TXmodify}}\right)\right) - \min\left(\arg\left(\frac{1}{C_{TXmodify}}\right)\right);$$

$$\varepsilon_{RXAMPdB} = \max\left(20lg\left(\left|\frac{1}{C_{RXmodify}}\right|\right)\right) - \min\left(20lg\left(\left|\frac{1}{C_{RXmodify}}\right|\right)\right); \text{ and}$$

$$\varepsilon_{RXPHZdeg} = \max\left(\arg\left(\frac{1}{C_{RXmodify}}\right)\right) - \min\left(\arg\left(\frac{1}{C_{RXmodify}}\right)\right).$$

Updating of the calibration period T_i by the updating module 304 includes:

the transmission calibration period included in the current calibration period T_i is updated:

with $\epsilon_{TXAMPdBInitial}<\epsilon_{TXAMPdB\_limit}$ and $\epsilon_{TXPHZdegInitial}<\epsilon_{TXPHZdeg\_limit}$, if $\epsilon_{TXAMPdB}<\epsilon_{TXAMPdB\_limit}$ and $\epsilon_{TXPHZdeg}<\epsilon_{TXPHZdeg\_limit}$, the transmission calibration period is updated to Ti_TX=k*Ti_TX; otherwise, the transmission calibration period is kept unchanged as Ti_TX=Ti_TX; and with $\epsilon_{TXAMPdBInitial}\geq\epsilon_{TXAMPdB\_limit}$ or $\epsilon_{TXPHZdegInitial}\geq\epsilon_{TXPHZdeg\_limit}$, if $\epsilon_{TXAMPdB}<\epsilon_{TXAMPdB\_limit}$ and $\epsilon_{TXPHZdeg}<\epsilon_{TXPHZdeg\_limit}$, the transmission calibration period is kept unchanged as Ti_TX=Ti_TX; otherwise, the transmission calibration period is updated to Ti_TX=Ti_TX/k, where $\epsilon_{TXAMPdBInitial}$ and $\epsilon_{TXPHZdegInitial}$ are non-updated calibration parameters, $\epsilon_{TXAMPdB}$ and $\epsilon_{TXPHZdeg}$ are updated calibration parameters, $\epsilon_{TXAMPdB\_limit}$ and $\epsilon_{TXPHZdeg\_limit}$ are thresholds of permissible maximum calibration parameters, and k>=1; and the reception calibration period included in the current calibration period T_i is updated:

with $\epsilon_{RXAMPdBInitial}<\epsilon_{RXAMPdB\_limit}$ and $\epsilon_{RXPHZdegInitial}<\epsilon_{RXPHZdeg\_limit}$, if $\epsilon_{RXAMPdB}<\epsilon_{RXAMPdB\_limit}$ and $\epsilon_{RXPHZdeg}<\epsilon_{RXPHZdeg\_limit}$, the reception calibration period is updated to Ti_RX=k*Ti_RX; otherwise, the reception calibration period is kept unchanged as Ti_RX=Ti_RX; and with $\epsilon_{RXAMPdBInitial}\geq\epsilon_{RXAMPdB\_limit}$ or $\epsilon_{RXPHZdegInitial}\geq\epsilon_{RXPHZdeg\_limit}$, if $\epsilon_{RXAMPdB}<\epsilon_{RXAMPdB\_limit}$ and $\epsilon_{RXPHZdeg}<\epsilon_{RXPHZdeg\_limit}$, the reception calibration period is kept unchanged as Ti_RX=Ti_RX; otherwise, the reception calibration period is updated to Ti_RX=Ti_RX/k, where $\epsilon_{RXAMPdBInitial}$ and $\epsilon_{RXPHZdegInitial}$ are non-updated calibration parameters, $\epsilon_{RXAMPdB}$ and $\epsilon_{RXPHZdeg}$ are updated calibration parameters, $\epsilon_{RXAMPdB\_limit}$ and $\epsilon_{RXPHZdeg\_limit}$ are thresholds of permissible maximum calibration parameters, k>=1, and Ti_RX is a previously used reception calibration period.

The foregoing solution proposed by the invention can monitor in real time a varying difference of the radio frequency channel through the calibration error parameters and reflect in real time calibration precision by reporting the calibration error parameters. Furthermore, the foregoing solution proposed by the invention can adjust in real time a calibration period according to the calibration error parameters by shortening the calibration period for a rapidly varying radio frequency channel or lengthening the calibration period for a slowly varying radio frequency channel and perform in a timely way reasonable antenna calibration in view of the calibration precision. The foregoing solution proposed by the invention makes minor modifications to an existing system without any influence on compatibility of the system and is easy and efficient to implement.

Those ordinarily skilled in the art can appreciate that all or a part of the steps in the method according to the foregoing embodiments of the invention can be performed in program instructing relevant hardware, the program may be stored in a computer readable storage medium, and when executed, the program can perform one or a combination of the steps in the method according to the embodiments.

Furthermore, the respective functional elements in the respective embodiments of the invention can be integrated in a processing module or can physically exist separately or two or more of the elements can be integrated in a module. The integrated module can be embodied in the form of hardware or in the form of a software functional module. If the integrated module is embodied in the form of a software functional module and sold or used as a separate product, it can be stored in a computer readable storage medium.

The storage medium mentioned above can be a read only memory, a magnetic disk, or an optical disk, etc.

The foregoing description is merely illustrative of the preferred embodiments of the invention, and it shall be noted that those ordinarily skilled in the art can further make several adaptations and modifications without departing from the principle of the invention and these adaptations and modifications shall also be construed as coming into the scope of the invention.

The invention claimed is:

1. An antenna calibrating method, comprising:

obtaining a calibration period T_i updated after previous antenna calibration and calculating a calibration sequence of each antenna channel in the calibration period T_i;

calibrating each antenna in the calibration period T_i according to the calibration sequence of the each antenna channel and calculating calibration error parameters; and updating the calibration period T_i according to the obtained calibration error parameters, wherein the updated calibration period T_i is used for next antenna calibration.

2. The antenna calibrating method according to claim 1, wherein the calibration of each antenna comprises transmission calibration and reception calibration, and the calibration period T_i comprises a transmission calibration period and a reception calibration period.

3. The antenna calibrating method according to claim 2, wherein the calibration error parameters comprise calibration coefficients, maximum amplitude deviations of the calibrated channel and maximum phase deviations of the calibrated channel:

the calibration coefficients comprise a transmission calibration coefficient $C_{TX}(n)$ and a reception calibration coefficient $C_{RX}(n)$, wherein n=1, 2, . . . , N, and N is the number of antenna radio frequency channels;

the maximum amplitude deviations of the calibrated channel comprise a maximum amplitude deviation $\epsilon_{TXAMPdB}$ of the transmission-calibrated channel and a maximum amplitude deviation $\epsilon_{RXAMPdB}$ of the reception-calibrated channel; and the maximum phase deviations of the calibrated channel comprise a maximum phase deviation $\epsilon_{TXPHZdeg}$ of the transmission-calibrated channel and a maximum phase deviation $\epsilon_{RXPHZdeg}$ of the reception-calibrated channel.

4. The antenna calibrating method according to claim 3, wherein:

the transmission calibration comprises:

transmitting respective signals $C_{TXI}(n)\cdot\underline{m}^{n}$ over the respective antenna channels, wherein $C_{TXI}(n)$ is a calibration coefficient obtained in a previous calibration period, and $\underline{m}^{n}$ is a calibration sequence;

calculating the transmission calibration coefficient of the calibration period T_i as $C_{TX}(n)=C_{TXmodify}(n)\cdot C_{TXI}(n)$, wherein $$C_{TXmodify}(n) = \frac{\min(h_{max}^1, \ldots, h_{max}^N)}{h_{max}^n},$$

$h_{max}^n = \max(h^n)$, and $h^n$ is a channel characteristic of an antenna radio frequency channel n; and performing transmission calibration on the antenna radio frequency channel n through the transmission calibration coefficient $C_{TX}(n)$; and the reception calibration comprises:

receiving respective signals $C_{RXI}(n)\cdot \underline{m}^n$ over the respective antenna channels, wherein $C_{RXI}(n)$ is a calibration coefficient obtained in a previous calibration period, and $\underline{m}^n$ is a calibration sequence;

calculating the reception calibration coefficient of the calibration period T_i as $C_{RX}(n)=C_{RXmodify}(n)\cdot C_{RXI}(n)$, wherein $$C_{RXmodify}(n) = \frac{\min(h_{max}^1, \ldots, h_{max}^N)}{h_{max}^n},$$

$h_{max}^n = \max(h^n)$, and $h^n$ is a channel characteristic of an antenna radio frequency channel n; and performing reception calibration on the antenna radio frequency channel n through the reception calibration coefficient $C_{RX}(n)$.

5. The antenna calibrating method according to claim 4, wherein calculation of the calibration error parameters comprises:

$$\varepsilon_{TXAMPdB} = \max\left(20lg\left(\left|\frac{1}{C_{TXmodify}}\right|\right)\right) - \min\left(20lg\left(\left|\frac{1}{C_{TXmodify}}\right|\right)\right);$$

$$\varepsilon_{TXPHZdeg} = \max\left(\arg\left(\frac{1}{C_{TXmodify}}\right)\right) - \min\left(\arg\left(\frac{1}{C_{TXmodify}}\right)\right);$$

$$\varepsilon_{RXAMPdB} = \max\left(20lg\left(\left|\frac{1}{C_{RXmodify}}\right|\right)\right) - \min\left(20lg\left(\left|\frac{1}{C_{RXmodify}}\right|\right)\right); \text{ and}$$

$$\varepsilon_{RXPHZdeg} = \max\left(\arg\left(\frac{1}{C_{RXmodify}}\right)\right) - \min\left(\arg\left(\frac{1}{C_{RXmodify}}\right)\right).$$

6. The antenna calibrating method according to claim 4, wherein updating of the calibration period T_i comprises:

updating the transmission calibration period comprised in the current calibration period T_i by:

with $\epsilon_{TXAMPdBInitial}<\epsilon_{TXAMPdB\_limit}$ and $\epsilon_{TXPHZdegInitial}<\epsilon_{TXPHZdeg\_limit}$, if $\epsilon_{TXAMPdB}<\epsilon_{TXAMPdB\_limit}$ and $\epsilon_{TXPHZdeg}<\epsilon_{TXPHZdeg\_limit}$, updating the transmission calibration period to Ti_TX=k*Ti_TX; otherwise, keeping the transmission calibration period unchanged as Ti_TX=Ti_TX; and with $\epsilon_{TXAMPdBInitial}\geq\epsilon_{TXAMPdB\_limit}$ or $\epsilon_{TXPHZdegInitial}\geq\epsilon_{TXPHZdeg\_limit}$, if $\epsilon_{TXAMPdB}<\epsilon_{TXAMPdB\_limit}$ and $\epsilon_{TXPHZdeg}<\epsilon_{TXPHZdeg\_limit}$, keeping the transmission calibration period unchanged as Ti_TX=Ti_TX; otherwise, updating the transmission calibration period to Ti_TX=Ti_TX/k, wherein $\epsilon_{TXAMPdBInitial}$ and $\epsilon_{TXPHZdegInitial}$ are non-updated calibration parameters, $\epsilon_{TXAMPdB}$ and $\epsilon_{TXPHZdeg}$ are updated calibration parameters, $\epsilon_{TXAMPdB\_limit}$ and $\epsilon_{TXPHZdeg\_limit}$ are thresholds of permissible maximum calibration parameters, and k>=1; and updating the reception calibration period comprised in the current calibration period T_i by:

with $\epsilon_{RXAMPdBInitial}<\epsilon_{RXAMPdB\_limit}$ and $\epsilon_{RXPHZdegInitial}<\epsilon_{RXPHZdeg\_limit}$, if $\epsilon_{RXAMPdB}<\epsilon_{RXAMPdB\_limit}$ and $\epsilon_{RXPHZdeg}<\epsilon_{RXPHZdeg\_limit}$, updating the reception calibration period to Ti_RX=k*Ti_RX; otherwise, keeping the reception calibration period unchanged as Ti_RX=Ti_RX; and with $\epsilon_{RXAMPdBInitial}\geq\epsilon_{RXAMPdB\_limit}$ or $\epsilon_{RXPHZdegInitial}\geq\epsilon_{RXPHZdeg\_limit}$, if $\epsilon_{RXAMPdB}<\epsilon_{RXAMPdB\_limit}$ and $\epsilon_{RXPHZdeg}<\epsilon_{RXPHZdeg\_limit}$, keeping the reception calibration period unchanged as Ti_RX=Ti_RX; otherwise, updating the reception calibration period to Ti_RX=Ti_RX/k, wherein $\epsilon_{RXAMPdBInitial}$ and $\epsilon_{RXPHZdegInitial}$ are non-updated calibration parameters, $\epsilon_{RXAMPdB}$ and $\epsilon_{RXPHZdeg}$ are updated calibration parameters, $\epsilon_{RXAMPdB\_limit}$ and $\epsilon_{RXPHZdeg\_limit}$ are thresholds of permissible maximum calibration parameters, and k>=1.

7. An antenna calibrating device, comprising:

an obtaining module configured to obtain a calibration period T_i updated after previous antenna calibration;

a calculating module configured to calculate a calibration sequence of each antenna channel in the calibration period T_i;

a calibrating module configured to calibrate each antenna in the calibration period T_i according to the calibration sequence of the each antenna channel and to calculate calibration error parameters; and an updating module configured to update the calibration period T_i according to the obtained calibration error parameters, wherein the updated calibration period T_i is used for next antenna calibration.

8. The antenna calibrating device according to claim 7, wherein calibration of each antenna by the calibrating module comprises transmission calibration and reception calibration, and the calibration period T_i comprises a transmission calibration period and a reception calibration period.

9. The antenna calibrating device according to claim 8, wherein the calibration error parameters calculated by the calibrating module comprise calibration coefficients, maximum amplitude deviations of the calibrated channel and maximum phase deviations of the calibrated channel:

the calibration coefficients comprise a transmission calibration coefficient $C_{TX}(n)$ and a reception calibration coefficient $C_{RX}(n)$, wherein n=1, 2, . . . , N, and N is the number of antenna radio frequency channels;

the maximum amplitude deviations of the calibrated channel comprise a maximum amplitude deviation $\epsilon_{TXAMPdB}$ of the transmission-calibrated channel and a maximum amplitude deviation $\epsilon_{RXAMPdB}$ of the reception-calibrated channel; and the maximum phase deviations of the calibrated channel comprise a maximum phase deviation $\epsilon_{TXPHZdeg}$ of the transmission-calibrated channel and a maximum phase deviation $\epsilon_{RXPHZdeg}$ of the reception-calibrated channel.

10. The antenna calibrating device according to claim 9, wherein:

transmission calibration by the calibrating module comprises:

transmitting respective signals $C_{TXI}(n)\cdot \underline{m}^n$ over the respective antenna channels, wherein $C_{TXI}(n)$ is a calibration coefficient obtained in a previous calibration period, and $\underline{m}^n$ is a calibration sequence;

the calibrating module calculating the transmission calibration coefficient of the calibration period T_i as $C_{TX}(n)=C_{TXmodify}(n)\cdot C_{TXI}(n)$, wherein $$C_{TXmodify}(n) = \frac{\min(h_{max}^1, \ldots, h_{max}^N)}{h_{max}^n},$$

$h_{max}^n = \max(h^n)$, and $h^n$ is a channel characteristic of an antenna radio frequency channel n; and the calibrating module performing transmission calibration on the antenna radio frequency channel n through the transmission calibration coefficient $C_{TX}(n)$; and reception calibration by the calibrating module comprises:

receiving respective signals $C_{RXI}(n)\cdot \underline{m}^n$ over the respective antenna channels, wherein $C_{RXI}(n)$ is a calibration coefficient obtained in a previous calibration period, and $\underline{m}^n$ is a calibration sequence;

the calibrating module calculating the reception calibration coefficient of the calibration period T_i as $C_{RX}(n) = C_{RXmodify}(n)\cdot C_{RXI}(n)$, wherein $$C_{RXmodify}(n) = \frac{\min(h_{max}^1, \ldots, h_{max}^N)}{h_{max}^n},$$

$h_{max}^n = \max(h^n)$, and $h^n$ is a channel characteristic of an antenna radio frequency channel n; and the calibrating module performing reception calibration on the antenna radio frequency channel n through the reception calibration coefficient $C_{RX}(n)$.

11. The antenna calibrating device according to claim 10, wherein calculation of the calibration error parameters by the calibrating module comprises:

$$\varepsilon_{TXAMPdB} = \max\left(20lg\left(\left|\frac{1}{C_{TXmodify}}\right|\right)\right) - \min\left(20lg\left(\left|\frac{1}{C_{TXmodify}}\right|\right)\right);$$

$$\varepsilon_{TXPHZdeg} = \max\left(\arg\left(\frac{1}{C_{TXmodify}}\right)\right) - \min\left(\arg\left(\frac{1}{C_{TXmodify}}\right)\right);$$

$$\varepsilon_{RXAMPdB} = \max\left(20lg\left(\left|\frac{1}{C_{RXmodify}}\right|\right)\right) - \min\left(20lg\left(\left|\frac{1}{C_{RXmodify}}\right|\right)\right); \text{ and}$$

$$\varepsilon_{RXPHZdeg} = \max\left(\arg\left(\frac{1}{C_{RXmodify}}\right)\right) - \min\left(\arg\left(\frac{1}{C_{RXmodify}}\right)\right).$$

12. The antenna calibrating device according to claim 11, wherein updating of the calibration period T_i by the updating module comprises:

updating the transmission calibration period comprised in the current calibration period T_i by:

with $\epsilon_{TXAMPdBInitial} < \epsilon_{TXAMPdB\_limit}$ and $\epsilon_{TXPHZdegInitial} < \epsilon_{TXPHZdeg\_limit}$, if $\epsilon_{TXAMPdB} < \epsilon_{TXAMPdB\_limit}$ and $\epsilon_{TXPHZdeg} < \epsilon_{TXPHZdeg\_limit}$, updating the transmission calibration period to Ti_TX=k*Ti_TX; otherwise, keeping the transmission calibration period unchanged as Ti_TX=Ti_TX; and with $\epsilon_{TXAMPdBInitial} \geq \epsilon_{TXAMPdB\_limit}$ or $\epsilon_{TXPHZdegInitial} \geq \epsilon_{TXPHZdeg\_limit}$, if $\epsilon_{TXAMPdB} < \epsilon_{TXAMPdB\_limit}$ and $\epsilon_{TXPHZdeg} < \epsilon_{TXPHZdeg\_limit}$, keeping the transmission calibration period unchanged as Ti_TX=Ti_TX; otherwise, updating the transmission calibration period to Ti_TX=Ti_TX/k, wherein $\epsilon_{TXAMPdBInitial}$ and $\epsilon_{TXPHZdegInitial}$ are non-updated calibration parameters, $\epsilon_{TXAMPdB}$ and $\epsilon_{TXPHZdeg}$ and are updated calibration parameters, $\epsilon_{TXAMPdB\_limit}$ and $\epsilon_{TXPHZdeg\_limit}$ are thresholds of permissible maximum calibration parameters, and k>=1; and updating the reception calibration period comprised in the current calibration period T_i by:

with $\epsilon_{RXAMPdBInitial} < \epsilon_{RXAMPdB\_limit}$ and $\epsilon_{RXPHZdegInitial} < \epsilon_{RXPHZdeg\_limit}$, if $\epsilon_{RXAMPdB} < \epsilon_{RXAMPdB\_limit}$ and $\epsilon_{RXPHZdeg} < \epsilon_{RXPHZdeg\_limit}$, updating the reception calibration period to Ti_RX=k*Ti_RX; otherwise, keeping the reception calibration period unchanged as Ti_RX=Ti_RX; and with $\epsilon_{RXAMPdBInitial} \geq \epsilon_{RXAMPdB\_limit}$ or $\epsilon_{RXPHZdegInitial} \geq \epsilon_{RXPHZdeg\_limit}$, if $\epsilon_{RXAMPdB} < \epsilon_{RXAMPdB\_limit}$ and $\epsilon_{RXPHZdeg} < \epsilon_{RXPHZdeg\_limit}$, keeping the reception calibration period unchanged as Ti_RX=Ti_RX; otherwise, updating the reception calibration period to Ti_RX=Ti_RX/k, wherein $\epsilon_{RXAMPdBInitial}$ and $\epsilon_{RXPHZdegInitial}$ are non-updated calibration parameters, $\epsilon_{RXAMPdB}$ and $\epsilon_{RXPHZdeg}$ are updated calibration parameters, $\epsilon_{RXAMPdB\_limit}$ and $\epsilon_{RXPHZdeg\_limit}$ are thresholds of permissible maximum calibration parameters, and k>=1.

* * * * *